United States Patent [19]
Cardarelli

[11] Patent Number: 6,053,464
[45] Date of Patent: Apr. 25, 2000

[54] SUCTION CUP ATTACHMENT SYSTEM FOR USE IN A SHOWER

[76] Inventor: Venanzio Cardarelli, 20 N. Triangle, Plymouth, Mass. 02364

[21] Appl. No.: 09/227,668

[22] Filed: Jan. 8, 1999

Related U.S. Application Data

[60] Provisional application No. 60/071,136, Jan. 13, 1998.

[51] Int. Cl.[7] ................................................. A45D 42/14
[52] U.S. Cl. .................................. 248/205.8; 248/206.2; 248/206.3
[58] Field of Search .......................... 248/205.7, 205.8, 248/205.9, 206.2, 206.3, 206.4, 683, 362, 363

[56] References Cited

U.S. PATENT DOCUMENTS

| | | | |
|---|---|---|---|
| 1,714,422 | 5/1929 | Hanson | 248/205.9 |
| 2,839,260 | 6/1958 | Jacobi | 248/362 |
| 2,901,760 | 9/1959 | Nelson | 15/160 |
| 3,078,484 | 2/1963 | Briggs | 15/21.1 |
| 3,115,322 | 12/1963 | Fleming | 248/694 |
| 4,417,362 | 11/1983 | Walker | 4/606 |
| 4,696,068 | 9/1987 | Kenner | 4/606 |
| 4,699,127 | 10/1987 | Schley | 128/62 R |
| 4,945,598 | 8/1990 | Racioppi | 15/160 |
| 5,072,480 | 12/1991 | Peters et al. | 15/469 |
| 5,195,511 | 3/1993 | Kodato et al. | 128/66 |
| 5,277,389 | 1/1994 | Ballares et al. | 248/206.3 |
| 5,348,168 | 9/1994 | Emery | 248/206.3 |
| 5,381,990 | 1/1995 | Belokin et al. | 248/205.8 |
| 5,628,083 | 5/1997 | Hayes | 15/244.3 |

*Primary Examiner*—Ramon O. Ramirez
*Assistant Examiner*—Gwendolyn Baxter
*Attorney, Agent, or Firm*—D. Michael Burns

[57] ABSTRACT

An improved system for attaching suction cup devices to bathroom or shower walls. The system includes attachments including brushes, sponges, cloths, massaging items etc., which are primarily used to aid people in achieving proper bathing hygiene. The suction cups are intended for use individually or in clusters of two or more and are designed for quick connection and removal to any vertical surface.

5 Claims, 3 Drawing Sheets

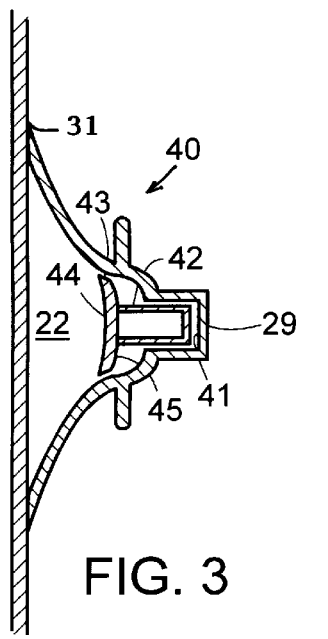
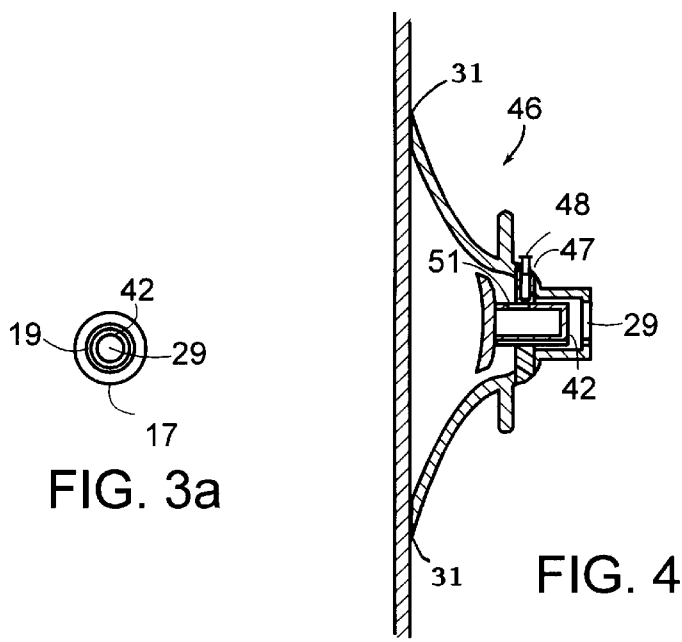
FIG. 3   FIG. 3a   FIG. 4
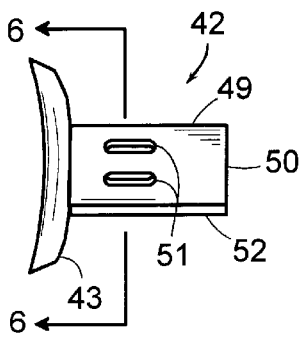
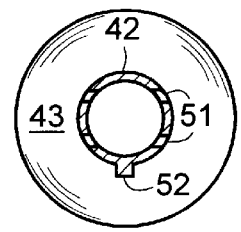
FIG. 5   FIG. 6
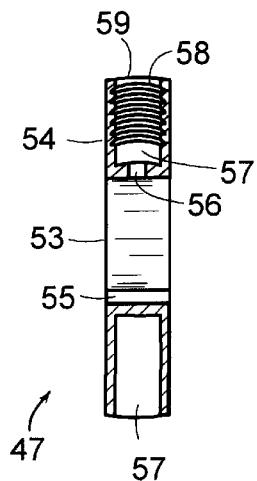
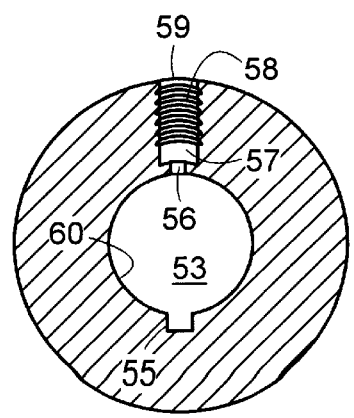
FIG. 7   FIG. 8

SUCTION CUP ATTACHMENT SYSTEM FOR USE IN A SHOWER

CROSS REFERENCE TO RELATED APPLICATION

This application is based on Provisional Patent Application Ser. No. 60/071,136, filed Jan. 13, 1998.

BACKGROUND OF THE INVENTION

1. Field of the Invention

This invention relates to a support system for use in the shower and bath, and includes a method of attaching a suction cup device to a shower or bath wall. The device will support a variety of personalized items such as those used for brushing, cleansing or massaging the human anatomy.

2. Description of the Prior Art

The human anatomy is so constructed that it does not always allow for proper backside hygiene; for example between the shoulder blades and areas contiguous thereto. Even when these areas are reachable with the aid of a handle brush, it often is not very satisfactory because the proper amount of pressure and directional application is sometimes hard to achieve. It is difficult to clean one's back, even by the very dextrous who are supple in the manipulation of their arms. It is desirable to cleanse and massage one's back when taking a shower and it is also desirable to provide a device that is sufficiently personalized, such as individual brushes, sponges, cloths and massaging devices. This would allow individual members of a family to be able to have their own showering systems; those that meet their individual specifications. This also would allow each member of the family the ability to remove their personalized devices for cleaning or for use somewhere else. There has been considerable interest over the years in back cleaning and massaging devices. The market is saturated with a variety of long handle brushes and other massaging items. There is also a large prior art involving devices that are affixed to a shower/ bathtub wall. The present invention is removably affixed to a shower or bathtub wall, wherein numerous devices can be attached for brushing, scrubbing, cleansing, massaging, or the invention can also be used merely to hold bathing accessories. It is highly desirable that the bather be able to use his/her own movement against the brushes, thus allowing an efficient means to reach those inaccessible parts of the body.

The prior art reveals numerous devices designed to assist in the shower washing process. For example the U.S. Pat. No. 3,115,322 issued Dec. 24, 1963 to J. A. Fleming, teaches the use of a rotary back scrubber for installation in bathtub and shower stalls. Fleming discloses a device that can be easily adjustable as to height and may be installed temporarily if desired. To accomplish the adjustability of his invention, Fleming requires the installation of vertical and cross member bars. The present invention does not require any such rods and accomplishes the purpose with simple devices that would fit in one's pocket. Fleming's invention is not readily able to be used in a multiple cluster as is the present invention.

The patent to R. L. Briggs, Patent No. 3,078,484 issued Feb. 26, 1963, discloses a removable back brushing device which can be adjusted to various heights on the shower or bathtub wall. Again this invention is not readily available and virtually impossible to use in a cluster arrangement of 3, 4, 5, or more brush devices. It does not appear to be easily removable.

The U.S. Pat. No. 2,901,760 issued Sep. 1, 1959 to A. Nelson, teaches the use of an adjustable bath brush or body massaging assembly which can be utilized in a vertical direction and by the bather rubbing against the device. Nelson does not teach a method of placing his device in clusters or at different heights. His invention would not be easily removable for use at another location.

U.S. Pat. No. 4,699,127 issued to Schley on Oct. 13, 1987, discloses a back massager and scrubbing device that is adjustable but not easily adaptable. Thus multiple members of a family could not have their own individualized brushes etc. nor is this invention one that can be mounted in a cluster formation.

U.S. Pat. No. 4,696,068 issued to Kenner on Sep. 29, 1987 shows a back washer supported by a shower or bathtub wall. But it does not teach the easy removal for laundering and while it teaches the use of suction cups for removably securing to a wall, it does not teach a way to utilize the invention with mutiple types of devices such as brushes, rollers, sponges or cloths. Kenner also does not teach a system for allowing the user to design his/her own arrangement of devices as does the present invention.

U.S. Pat. No. 5,072,480 issued to Peters et al. on Dec. 17, 1991 discloses an assembly that includes a rigid support plate with a matrix of suction cups mounted to the rear of the surface thereof. While Peters et al. teaches deformable polymeric projectables arranged in alternating rows with bristle brushes, there does not appear to be a way for the individual user to have his personal set of brushes etc.. And though Peters et al. discloses an excellent backwashing assembly, it is a fixed system with no apparent provision for individual flexibility.

The U.S. Pat. No. 4,417,362 issued on Nov. 29, 1983 to Walker discloses a bathroom fixture that is made up of a combination of brushes and sponges. It is removably fixed to a shower or tub wall and the bather can generate his/her own degree of movement against it. Walker also utilizes suction cups to hold the device to a wall. Walker also teaches removably changing the brushes and sponges for different abrasion and stiffnesses one may desire. He accomplishes this by utilizing either slots for holding the sponges or channels for holding brushes in place. The device can itself be moved by the release of the suction cups from the wall. This invention teaches the use of a variety of easily accessible attachments. It does not teach a means for changing attachments by simply sliding the attachment over a connector; a connector that can of itself be moved to any wall surface and never requires a specific board surface.

None of the above inventions and patents, taken either singly or in combination, is seen to describe the instant invention as claimed.

SUMMARY OF THE INVENTION

The present invention relates to a system for attaching suction cup devices to a shower wall and connecting attachments to them. Such attachments can be in the form of brushes, sponges, cloth covered materials or massaging products to name a just a few examples. The device would be removably affixed to a bathtub or shower wall. In the preferred embodiment, the system comprises a base having a suction cup on one side and a longitudinally concentric connector on the other side. The suction cup device is made of one type of rubber and manufactured by an injection molding process. The cup device may be combined with other cup devices to form a multiple cluster using two or more devices. The connector does not have to be concentric.

It can also be square, triangular, hexagonal or octagonal, all of which would make the attachment non-rotational.

Another embodiment of the basic system is to have the cup device made from two different types of rubber. The suction cup would be a relatively more flexible, pliable rubber while the base and connector would be made from a more rigid, sturdier rubber material.

Still, another embodiment of the system is to unite the rubber suction cup with a plastic base and plastic connector which would allow the use of a pressure indicator having an internal seal. This would create a second seal and allow for an easier release of the cup from the wall.

Another embodiment of the invention is employed when a specific attachment requires an extra measure of support. The cup would utilize a male/female connection having three raised rings encircling the connector, and which are tightly fitted into three corresponding channels of the attachment.

And still yet another embodiment of the invention utilizes a pressure indicator with vent holes, a stabilizer and a vent screw for controlling the amount of escaping air, thus determining the quality of vacuum in the suction cup.

The system can be arranged in clusters of two or more cup devices, depending on the individual desires of the bather. The devices can be color coded for individual preferences. Each member of the family can have his/her own set of brushes, sponges etc.. The devices can be mounted directly to a bathtub/shower wall or on a flat surface such as a board which then may be permanently or removably affixed to the wall.

Accordingly, it is a principal object of the invention to provide a cup device that allows for the easy mounting and removal of bathing attachments.

It is still an object of the invention to provide a device that is simple and inexpensive to manufacture.

It is another object of the invention to provide a cup device that can be used individually as one unit or in clusters of two or more units.

It is still another object of the invention to allow the user to be able to position the attachments so that they will allow him/her to achieve proper hygiene for those hard to reach areas with the least amount of exertion under normal use. This is especially important for people who are unable to bend or reach certain areas of the body because of age or handicap.

It is an object of the present invention to allow each individual member of the family to have his/her own set of personalized attachments, each of which can easily be mounted or removed for cleaning and storage.

These and other objects of the present invention will become readily apparent upon further review of the following drawings and specifications.

BRIEF DESCRIPTION OF THE DRAWINGS

FIG. 3 is a side elevational cross sectional view of still another embodiment of the invention, wherein the connector and base are made plastic and have a pressure indicator.

FIG. 3a is a frontal view of the connector showing the relationship of the pressure indicator to the opening in the connector surface which acts as an auxiliary seal.

FIG. 4 is a side elevational cross sectional view of the invention including the stabilizer and vent screw.

FIG. 5 is a longitudinal extending cross sectional view of the pressure indicator.

FIG. 6 is a sectional end view of the pressure indicator.

FIG. 7 is a cross sectional view of the stabilizer.

FIG. 8 is a concentrical cross sectional view of the stabilizer.

Similar reference characters denote corresponding features consistently throughout the attached drawings.

DETAILED DESCRIPTION OF THE PREFERRED EMBODIMENT

Figure 1:
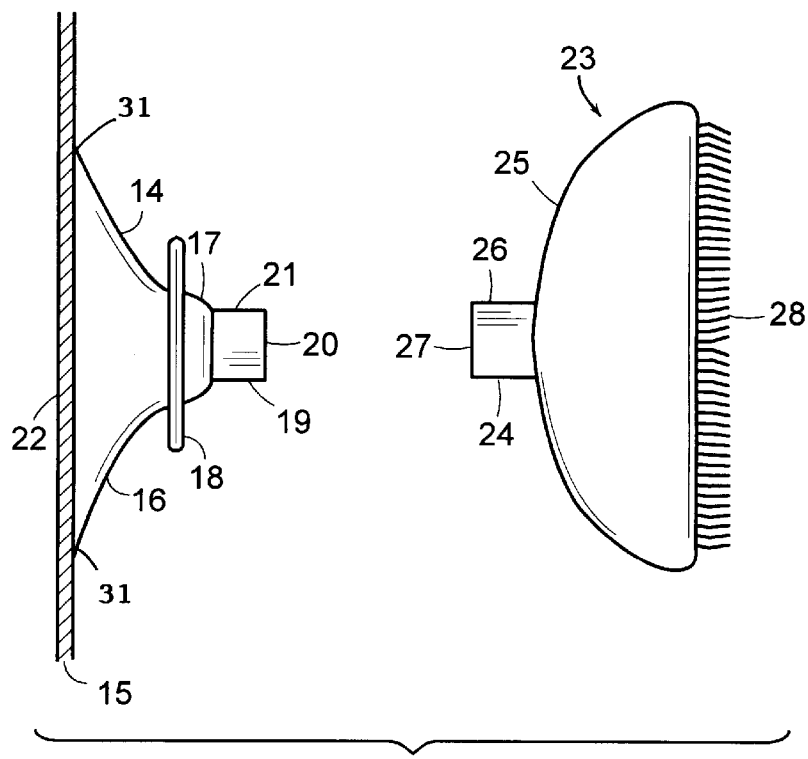
FIG. 1 is a side elevational view of the preferred embodiment showing the suction cup device with a mating brush adapter attachment.

The present invention relates to a system for attaching suction cup devices to a shower/bathtub wall, then connecting shower accessories to the devices. This will allow each member of the family to individualize his/her needs as they relate to height, or bristle stiffness; and, more specifically the type of device, whether it be brush, rollers, sponge or cloth. Referring now specifically to the drawings, the system of the present invention is shown in FIG. 1 and includes a suction cup device, designated by reference numeral 14 and a removable shower accessory designated by numeral 23. The cup device 14 is normally mounted to a vertical surface 15 such as a wall, or even a board that may be permanently or removably mounted to the wall. The cup device 14 is a one piece, all rubber construction comprising a basically conical cup 16, which defines an empty chamber 30, said cup 16 having a large opening 22 defined by a perimeter edge 31. The conical cup is integral with a concentric base 17, the base further having an elongated, concentric connector 19. The rubber material of the conical cup 16 is very pliable and is thinnest at the large opening 22. The connector 19 has a longitudinally, generally concentric exterior wall surface 21 and has one end integral with the base 17 and a distal end 20 extending outwardly from the device 14. In this preferred embodiment, the entire suction cup device 14 is manufactured from one rubber material and can be made by an injection molding process. The device when applied to the wall surface will have as a point of air escape, the perimeter edge 31 of the large opening 22 of the conical cup 16. For an accessory, a brush attachment 23 comprising of a plastic frame 25 and an adapter 24 is described. The adapter 24 includes a concentrically elongated coupling wall 26 which further defines an adapter opening 27 for slipping over the connector 19 resulting in a rotational fitting. Although the attaching brush device 23 is shown with bristles 28, it is to be understood that the attachment could also be a variety of accepted accessories such as sponges, cloth covered materials and massaging balls or rollers. A 360° finger hold 18 encircles the base 17 and is helpful when disconnecting the attachment 23 from the device 14. This allows the attachment to be removed without braking the suction holding the device 14 to the wall. The device 14 and corresponding attachments 23 can be color coded to indicate individual family member ownership and also to various levels of bristle stiffness and other attachment preferences. The connector 19, in addition to the concentric shape depicted, can also be square, triangular, hexagonal or octagonal which will make the attachment non-rotating(not shown). Other connecting shapes for the connector 19 are possible such as a round or oval shaped balls (not shown).

Another embodiment of the invention would be to manufacture the cup device 14 out of two different grades of rubber. The suction wall 16 rubber would be very thin, especially at the opening area 22. It would have a softer consistency and be more moldable, thus allowing it to displace air easier and therefore be easier to move. The base 17, connector 19 and finger hold 18 would be made from a more durable, less deforming rubber.

Figure 2:
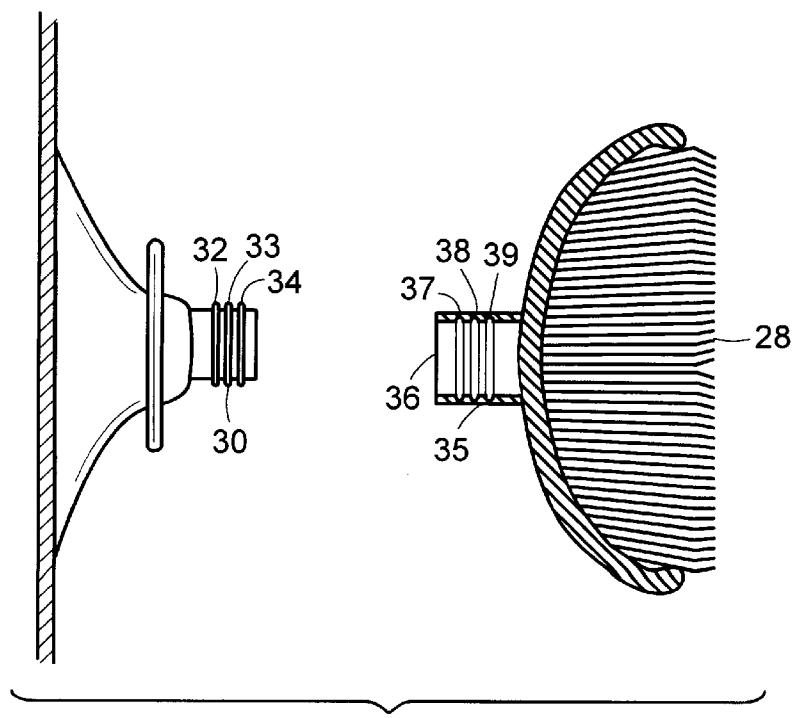
FIG. 2 is a side elevational view of another embodiment of the invention, showing a male type connector.

Another modification of the device 14 is shown in FIG. 2, wherein the connector 19 is further equipped with a plurality of concentric rings 32, 33, and 34, deposed on the exterior surface of the connector 19. The attachment would a female adapter 35 with an inner opening 36 for acceptance of the rings 32, 33 and 34. The adapter 35 having three channels 37, 38 and 39 for cooperatively accepting the rings 32, 33 and 34 respectively.

FIG. 3 depicts another embodiment of the suction cup device 14. In this embodiment the device 40 has a plastic material substituted for rubber in both the base 17 and in the connector 19. This plastic material allows for the opportunity to have an integral pressure indicator 42, which has an internal seal disc 43 on one end; this seal 43 having two surfaces, a concave surface 44 which will be the sealing surface and a convex surface 45, which is in a face to face relationship to the wall 15. When in operation the disc 43 will be propelled in a direction towards the distal end 20 of the connector 19, the concave surface 44 biasing against the inner wall of the base 17 creates an internal seal, thus giving the device 40 two sealing areas. FIG. 3a shows a small opening 29 in the distal end 20 of the connector 19, which is smaller in diameter than the diameter of the pressure indicator 42 and allows for the user to poke a finger into the opening 29 thus breaking the internal seal that is formed when the pressure indicator 42 is biased against the internal inner wall of the base 17.

Figure 9A:
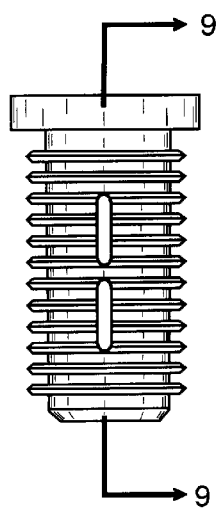
FIG. 9 is a longitudinal cross sectional view of the vent screw.
Figure 9B:
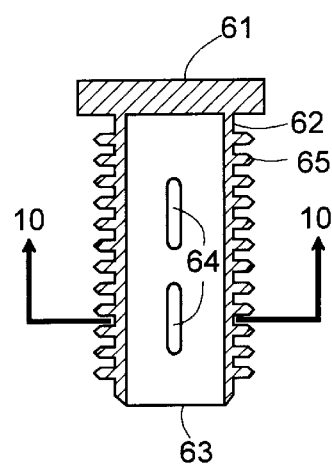
Figure 10:
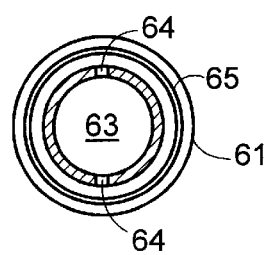
FIG. 10 is a cross sectional bottom view of the vent screw.

The embodiment 46, shown in FIG. 4 is by far the most complex, of the present invention, and although it is probably the most expensive to manufacture, it has the best means for mounting and releasing the suction cup 16. The cup device 46 includes the hollow pressure indicator 42 but with a plurality of air vent slots 51 defined within the longitudinal, cylindrical surface 49 of the indicator 42. FIGS. 5 and 6 detail these vent slots 51 and their relationship to the seal 43 at one end and the sealing edge 50, which biases against the distal end 20 of the connector 19. Longitudinally extending and integral with the indicator 42 is a rectangular ridge 52. This ridge 52 acts in concert with a stabilizer 47, which is disclosed in FIGS. 7 and 8, to maintain the the pressure indicator 42 in the proper geometric relationship. The stabilizer 47 is generally disc shaped and has two flat surfaces 54 which define between them a central opening 53 and a slotted channel 55. This slotted channel 55 accepts the ridge 52 of the pressure indicator 42 as the indicator penetrates the stabilizer 47 with the sealing edge 50, and maintains the proper alignment by seating the ridge 52 within the slot 55. The central opening 53 has an inner surface 60 defining the opening 53 as it extends through the stabilizer 47. This inner surface 60 has an air opening hole 56 leading to a cylindrically, elongated, hollow cavity 57, which is internally treaded 58. At the outer end of the hollow cavity 57 is a screw opening 59. This embodiment has an essentially hollow cylindrical vent screw 48 that is illustrated in FIGS. 9a, 9b and 10. The vent screw 48 has a longitudinal surface 62 which is externally threaded 65. The vent screw 48 further having two opposite ends, an outer end with a finger grip 61 and a lower end having an aeration opening 63 which is inserted into the screw opening 59 of the stabilizer 47. Defined within the longitudinal surface 62 are a plurality of ventilation holes 64. When in operation, this embodiment is placed on a wall surface by pressing it with the hand which will cause an escape of air through the perimeter of the cup opening 22, and another escape of air through an internal seal which was created by the convex seal surface 45 biasing against the sealing surface 54 of the stabilizer 47, which is now broken. The air will pass through and escape via ventilation holes 64 of the vent screw 48. When a desired vacuum is created the user will close the vent screw 48, the internal seal will be made by the outward projection of the pressure indicator 42, thus causing the seal 43 to be biased against the sealing surface 54 of the stabilizer 47 and also causing the connector sealing end 50 of the pressure indicator 42 to be biased against the inner wall of the distal end 41 of the connector 19. To remove this embodiment, one has to turn the vent screw 48 to expose the ventilation holes 64 to the atmosphere, thus allowing the air to enter through the stabilizer 47, then pass through the air vent slots 51 of the pressure indicator 42 to the chamber 30 within the conical cup 16. Also, by the digital depression of the pressure indicator 42, the internal seal will be broken causing the wall seal at the perimeter of the cup opening 22 to weaken. Some lateral physical movement of the hand will help break the wall seal but in this embodiment, very little exertion is required.

Figure 11:
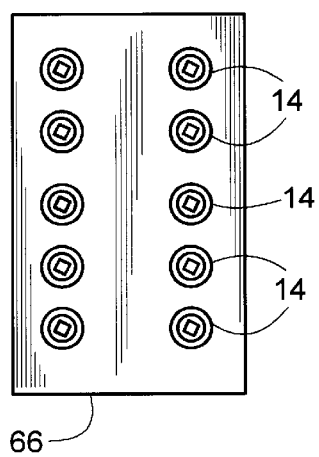
FIG. 11 is a environmental front view of a plurality of the cup devices mounted to a board surface.
Figure 12:
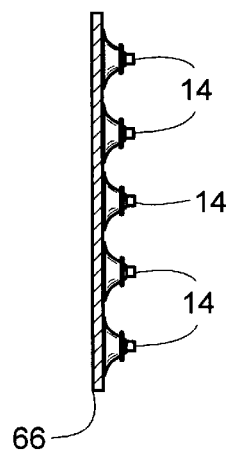
FIG. 12 is a side elevational view of the board.
Figure 13:
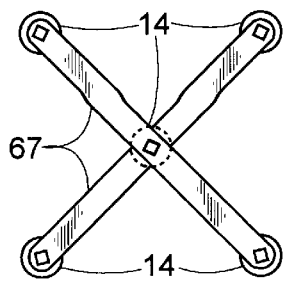
FIG. 13 is a frontal view of a plurality of the cup devices connected together in a cluster.

FIGS. 11, 12 and 13 are environmental views of a plurality of devices 14 which are shown as examples of how the devices 14 can be utilized. FIGS. 11 and 12 show a plurality of the devices 14 mounted on a board 66 instead of directly to a wall surface. The board 66 itself can then be removably or permanently affixed to a wall surface. The arrangement as shown in FIG. 11 is strictly a random selection. The present invention anticipates that these devices 14 can be placed in a myriad of numerical configurations and arrangements. Each individual member of a family might have his/her own specially designed layout. FIG. 13 depicts a typical cluster type arrangement whereby the devices 14 are interconnected by a connecting means 67. For example, the cluster could consist of two devices 14 with the connecting means 67 being a cloth covered wooden bar for massaging purposes. Another possibility would be hanging a bathroom accessory on the bar. The size of the devices 14 can be varied thus achieving various depths of protuberances from the wall which may therefore accommodate different types of attachments. An example would be to have a shorter extension from the wall for attachments around the buttocks region or longer extensions for those attachments reaching the middle of the back. All these various attachments can be color coded for ease of selection.

It is to be understood that the present invention is not limited to the sole embodiment described above, but encompasses and and all embodiments within the scope of the following claims.

I claim:

1. A suction cup attachment device for use on a shower wall in combination with a removable shower accessory, the device comprising:

a hollow base having a suction side adapted to face the wall, a connector side adapted to extend outwardly from the wall, and an inner surface;

a hollow cylindrical connector integral with the connector side of the base, the connector having a concentric surface adapted to extend to a distal end for rotatably mounting the shower accessory, the distal end having a small opening therein;

a conical cup integral with the suction side of the base, the cup having defining within the cup surface a chamber, the chamber having a perimeter edge defining a large opening for adhering the device to the wall;

an elongate cylindrical pressure indicator internally deposed in a sliding relationship within the base and the connector, the indicator having a leading edge at one end, the leading edge having a diameter larger than the diameter of the opening in the distal end of th connector, the indicator having a cylindrical surface defining a plurality of air vent slots disposed therein, the indicator having an internal seal disc at the other end, the seal disc having a concave surface on one side, whereby the device upon being adapted to be biased against the wall, air will escape from the chamber through the perimeter edge thereby causing a partial vacuum adapted to create a seal between the wall and the perimeter edge, while propelling the pressure indicator towards the distal end of the connector forming a second seal, an internal seal caused by the concave surface of the disc and the inner surface of the base, the process can be reversed by pushing a finger through the small opening at the distal end allowing air to dislodge the internal seal; and a finger hold integrally encircling the base, whereby the shower accessory can be unmounted for the device without breaking the suction seal at the wall.

2. The suction cup attachment device of claim 1, wherein the device includes:

a generally disc shaped stabilizer integrally deposed within the base for maintaining the proper alignment of the pressure indicator with the connector; and a vent screw integral with the base and stabilizer, whereby air can either be introduced to break the seals or to create the partial vacuum by closing the screw vent.

3. The suction cup attachment device of claim 2, wherein the device includes:

the pressure indicator having a ridge adapted to extend along the bottom portion thereof;

the stabilizer having an inner surface defining a central opening, the central opening contining a slotted channel being in direct alignment with the ridge such that the pressure indicator will be seated and positioned as the indicator slides back and forth through the stabilizer, the stabilizer having a threaded hollow cavity deposed within the disc surfaces, the cavity having an air opening hole at the end of the cavity; and the vent screw having a hollow chamber defined therein, an elongate external threaded surface having ventilation holes defined within, the screw having a lower end defining an aeration hole being in cooperating relationship with the air opening of the stabilizer, the screw having a manipulative tip head for turning the screw, whereby the partial vacuum is created by closing the ventilation holes to the atmosphere and the vacuum broken by exposing the ventilation holes to the atmosphere.

4. The suction cup atachment device of claim 3, wherein the shape of the connector can further be selected from a group consisting of square, triangular, hexagonal and octagonal.

5. The suction cup attachment device of claim 3, wherein a shower accessory is selected from the group consisting of brushes, massagers, sponges, rollers and cloth covered aticles.

* * * * *